United States Patent [19]
LeCroy

[11] Patent Number: 6,129,026
[45] Date of Patent: Oct. 10, 2000

[54] DUAL MODE CARGO TRANSPORT APPARATUS AND METHOD OF USING SAME

[75] Inventor: Donald L. LeCroy, Mableton, Ga.

[73] Assignee: Jervis B. Webb Company, Farmington Hills, Mich.

[21] Appl. No.: 09/038,694

[22] Filed: Mar. 9, 1998

Related U.S. Application Data

[60] Provisional application No. 60/046,636, May 16, 1997.

[51] Int. Cl.[7] ........................................... B61J 3/00
[52] U.S. Cl. ..................... 104/88.01; 104/88.02; 104/88.06
[58] Field of Search ............... 104/88.01, 88.02, 104/88.04, 88.05, 88.06; 105/72.2, 89, 124, 130

[56] References Cited

U.S. PATENT DOCUMENTS 3,067,697  12/1962  Doolittle .
4,015,539  4/1977  Hamada .
4,213,396  7/1980  Mehren et al. .
5,289,778  3/1994  Romine ................................... 104/288

FOREIGN PATENT DOCUMENTS 1 133 340  11/1968  United Kingdom .
1 544 699  4/1979  United Kingdom .
2 277 497  11/1994  United Kingdom .

Primary Examiner—S. Joseph Morano
Assistant Examiner—Robert J. McCarry, Jr.
Attorney, Agent, or Firm—Dickinson Wright PLLC

[57] ABSTRACT

A method and apparatus for handling cargo are disclosed which include a plurality of cargo carriers capable of being operated manually by human operators or remotely by a central controller. The carriers are operated in their manual mode to traverse paths near aircraft or other movable objects whose stopping positions cannot be accurately known until arrival. Once the carriers have been loaded and manually guided away from the movable object, they are driven onto a track from which point an automated controller takes over to guide the carriers to their destinations.

18 Claims, 3 Drawing Sheets

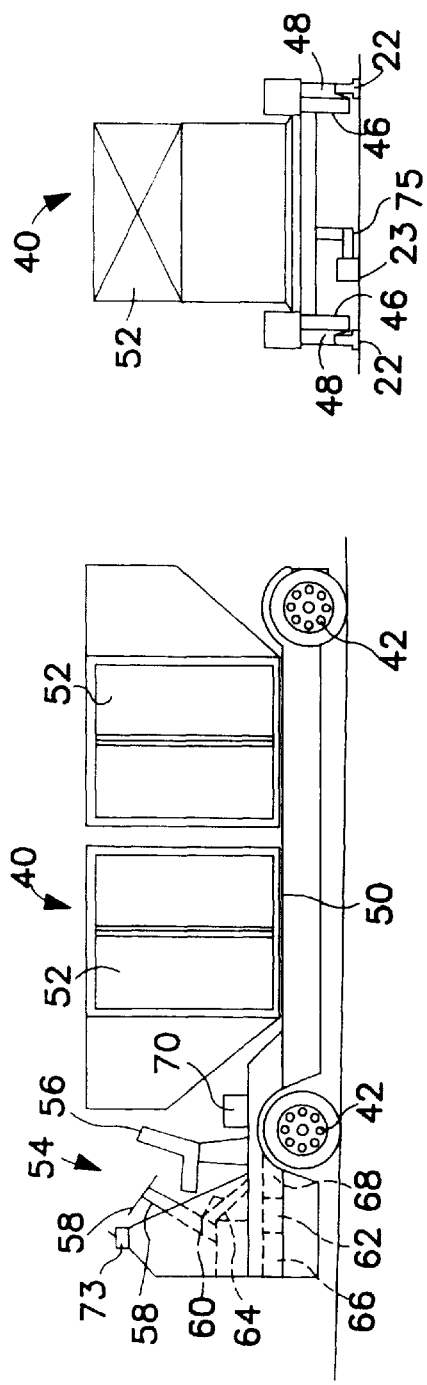
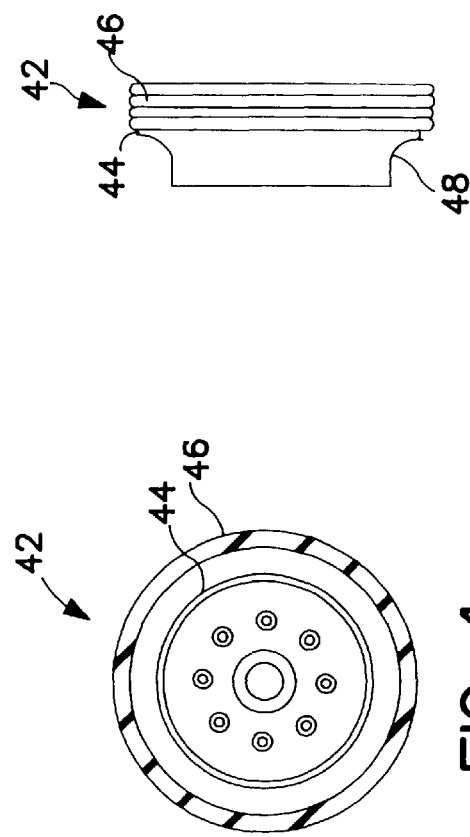

DUAL MODE CARGO TRANSPORT APPARATUS AND METHOD OF USING SAME

The application claims the benefit of U.S. provisional application Ser. No. 60/046,636, filed May 16, 1997.

The present application is directed toward a method and apparatus for transporting cargo. More particularly, this invention is directed toward an apparatus for transporting cargo which includes a vehicle capable of operating in both a manned and an unmanned mode and a method of transporting cargo using such a vehicle.

BACKGROUND OF THE INVENTION

Many types of vehicles, such as airplanes, ships, and trucks, are used to transport cargo from one location to another. Cargo must be loaded onto these vehicles at an origin location and removed therefrom at a destination location. Due to the size of the vehicles used, it is often necessary to park them some distance from the location where the cargo is stored at the origin or destination and to carry the cargo between the vehicle and the storage location.

This problem is particularly acute at airports where baggage must be moved from large aircraft to a baggage claim or storage area inside a terminal. Typically, baggage is unloaded from the hold of an aircraft by hand, placed onto a truck or trailer, and driven to an entrance in the terminal. From there it is unloaded from the truck onto a conveyor belt or onto an automated guided vehicle (AGV) and taken to the baggage claim or to a storage area. Baggage to be loaded aboard the plane is brought from within the terminal on a conveyor or an AGV, transferred to a truck or trailer, driven to the aircraft, and unloaded from the truck and placed into the aircraft.

Sometimes AGV's are used to transport baggage outside of a terminal. However, AGV's must generally follow well defined paths. When these paths are defined by rails, the rails cannot be run too close to an aircraft's gate approach without interfering with the free movement of the aircraft. When the paths are defined by reference markers, the AGV's are prone to drifting off course and could collide with and damage a plane. Furthermore, many different aircraft will use a given gate, and each of these aircraft will be positioned in a different manner when it arrives at the gate. The cargo doors of different aircraft are also located in a variety of different places. It is not practicable to program an AGV to arrive in exactly the right position for unloading from the various cargo doors of each of these aircraft, especially when the exact position and angle of the aircraft at the gate is unpredictable. Therefore, human operators are used to guide trucks up to the cargo hold of an aircraft and to drive these trucks away from the aircraft to a location where the baggage can be unloaded onto an automated baggage handling system. This need to manually transfer baggage from one transport device to another slows down the loading and unloading operations, increases the labor costs associated with baggage handling, and increases the risk that a bag will be misdirected and not arrive at the proper destination.

SUMMARY OF THE INVENTION

These problems and others are addressed by the present invention which comprises an apparatus for moving cargo that is operable in either a manned or unmanned mode and which can readily be switched between these modes. In the manned mode a driver uses conventional controls such as a steering wheel and brake pedal to guide a vehicle up to an airplane and to position it properly by the cargo door. In the unmanned mode, the driver leaves the vehicle and allows it to be controlled electronically in the manner of traditional automated guided vehicles (AGV's). The invention further comprises a method for cargo handling, namely using a dual-mode vehicle in a manned mode near an aircraft and then shifting the vehicle to a unmanned mode so that it can be guided automatically to a destination.

In the preferred embodiment, the vehicle includes a set of controls, such as a throttle and steering linkages, and both manual and electronic actuators for these controls. When the vehicle is in the manual mode, the manual actuators, such as a steering wheel and accelerator pedal, can be used to operate the controls. When in the unmanned mode, electronic actuators connected to the steering linkages and the throttle control these functions. Alternately, when the vehicle travels on a track in its automated mode, the vehicle is steered by the tracks and it is not necessary to control the steering. In the automatic mode the actuators are controlled by an onboard controller and a remote central controller that communicates with the onboard controller via radio or any of the other known methods for communicating with an AGV. The vehicle also includes a switch for shifting back and forth between these manual and automatic modes. Preferably, the switch can be manually shifted into either mode. This allows a human operator to take control of the vehicle at any time, even when it is being guided electronically. In addition, a human operator can preferably prevent the central controller from taking control of the vehicle until such time as the operator decides it is proper to relinquish control. The central controller has the ability to shift the vehicle from automatic to manual control so that it may park the vehicle in a location for a human to retrieve. It is also possible to give the central controller authority to take command of a vehicle at any time, for collision avoidance purposes for example, but this is generally undesirable for safety reasons.

Preferably, the vehicle is powered by a battery when traveling under manual control away from the guidance tracks and by a power rail associated with the guidance rails when traveling under automatic control. The power from the power rail can also be used to charge the batteries onboard the vehicle. Alternately, the vehicles can be powered by a battery or other onboard power source at all times and the batteries can be periodically exchanged with charged batteries as the onboard batteries run down.

The preferred method of using a dual-mode cargo handling system is to provide a vehicle that can be controlled either manually or electronically and to operate the vehicle in its manual mode in the vicinity of aircraft or other objects whose positions can vary. Once the vehicle is loaded, it is driven to the entrance of an AGV pathway and control of the system is turned over to an electronic controller which maneuvers the vehicle about the pathway until it reaches an unloading location. Once the vehicle is unloaded, it returns automatically to an exit from the path where it can be retrieved by a human operator. Alternately, the vehicle may navigate to a storage location if it is not needed, or to a pick-up location where it can be loaded with cargo bound for an outgoing plane, for example.

It is therefore a principal object of the present invention to provide a vehicle capable of operating in either a manned or unmanned mode.

It is another object of the present invention to provide a method of using a vehicle capable of operating in either a manned or unmanned mode for moving cargo.

It is a further object of the present invention to provide a system for moving cargo from a mobile cargo carrier to an indoor cargo storage area.

It is still another object of the present invention to provide a method of transferring cargo from a mobile storage unit to a fixed storage location using a single vehicle.

It is still a further object of the present invention to provide a manual control system for an AGV to increase the number of locations in which the AGV can be used.

It is yet another object of the present invention to provide a cargo transport vehicle equipped with wheels that allow it to operate on both paved surfaces and on support rails.

It is yet a further object of the present invention to provide a cargo transport vehicle capable of automatically following a path defined by guide rails or being driven by a human operator.

It is another object of the present invention to provide a cargo transport vehicle of the forgoing character that draws current from a power rail when such a power rail is present and which draws current from onboard batteries when no power rail is present.

BRIEF DESCRIPTION OF THE DRAWINGS

These and other objects will become apparent from a reading and understanding of the following detailed description of a preferred embodiment of the invention together with the following drawings of which:

FIG. 2 is a side elevational view of a dual-mode vehicle for use in the system of the present invention;

FIG. 3 is a rear elevational view of the vehicle of FIG. 2 and a pair of support tracks;

FIG. 4 is a side front elevational view of one of the wheels of the vehicle shown in FIG. 2;

FIG. 5 is a side elevational view of the wheel of FIG. 4;

DETAILED DESCRIPTION OF A PREFERRED EMBODIMENT

Figure 1:
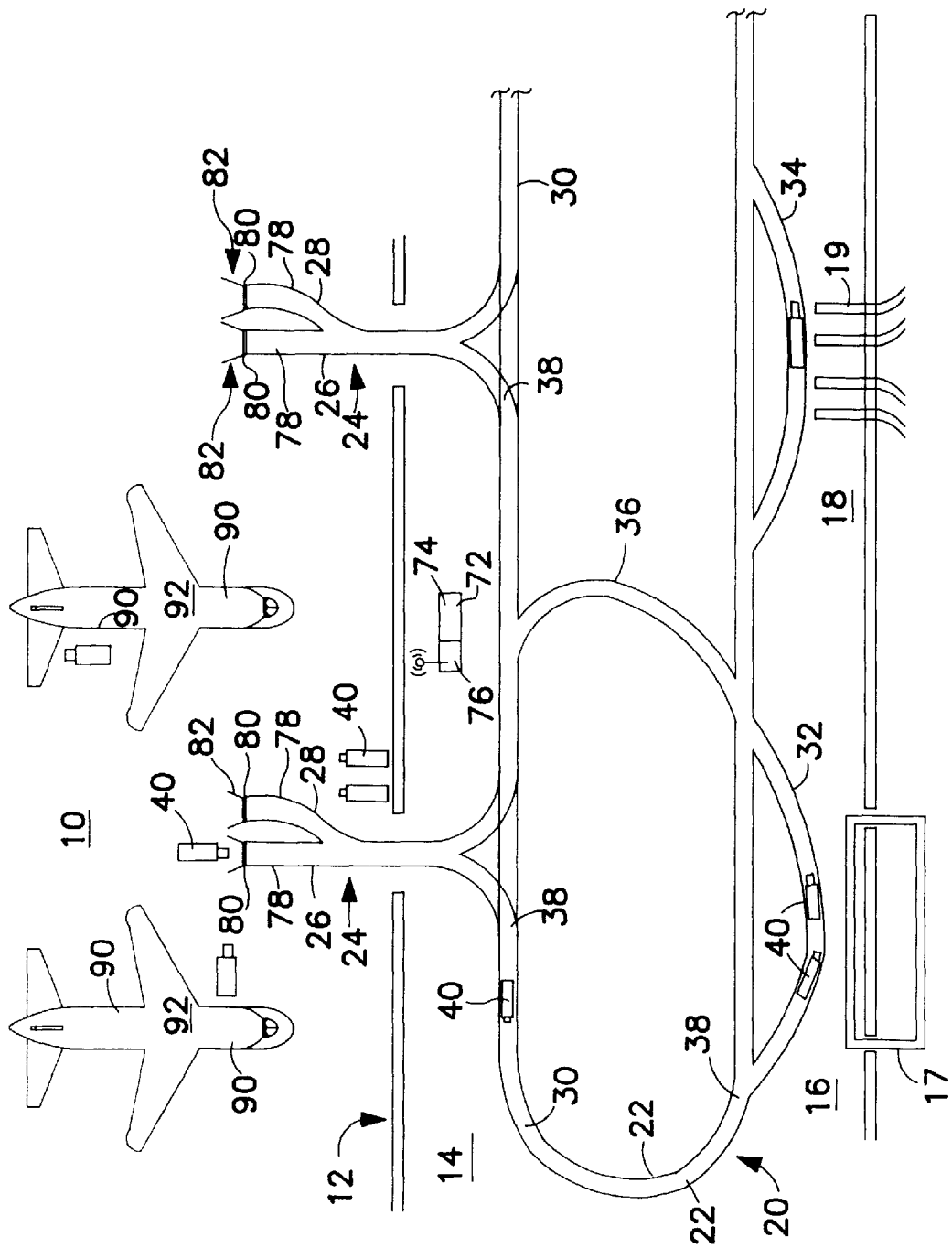
FIG. 1 is a plan view of a portion of an airport equipped with the system of the present invention.

Referring now to the drawings, wherein the showings are for purposes of illustrating a preferred embodiment of the subject invention only and not for purposes of limiting same, FIG. 1 shows a portion of an airport comprising a gate area 10 and a terminal 12. The terminal further includes a cargo transport area 14, a baggage claim area 16 and a make-up area 18. The gate area 10 and the various areas within the terminal are connected a rail system 20 made up of pairs of spaced-apart rails 22. A power rail 23 is positioned between rails 22 for providing power to vehicles as they traverse rail system 20.

Rail system 20 includes an end portion 24 in gate area 10 comprising an entrance segment 26 and an exit segment 28, and a main transport loop 30 inside terminal 12. Loop 30 further includes a first siding 32 in baggage claim area 16 near a baggage claim conveyor 17, a second siding 34 in make-up area 18 next to incoming baggage conveyors 19, and a storage spur 36 connected between two portions of loop 30. Various switches 38 are used to connect the different track segments to one another in a well known manner, and the switches are controlled by a central controller which will be described hereinafter. Additional sidings branch off of loop 30 at other baggage claims and make-up locations and can also be used for storing carriers when they are not being used.

A number of carriers 40 are provided which are equipped to travel either on the paved surface of gate area 10 or on rails 22. To this end, and as best seen in FIGS. 3 and 5, each carrier 40 is equipped with special wheels 42 which wheels include a first portion 44 for connecting to a tire 46 and a second portion 48 for engaging tracks 22 and supporting carrier 40 thereon. Carrier 40 also includes a cargo support area 50 which can be configured to hold cargo such as either individual pieces of luggage or unit loading devices (ULD's), which are large container for holding and transporting a group of objects going to the same destination. FIG. 2 shows carrier 40 equipped with two ULD's 52. Carrier 40 includes a cab 54 having a seat 56 for a driver, a steering wheel 58, an accelerator pedal 60 connected to a throttle 62 and a brake pedal 64 connected to a brake cylinder 66. Mounted in or beneath cab 54 is an electronic actuator 68 for actuating throttle 62 and brake cylinder 66 when the carrier is in an automatic guidance mode.

Carrier 40 also includes an on-board controller 70 for receiving signals from a central controller 72 and passing these commands to electronic actuator 68. Actuator 68 must be switched on using a switch 73 to enable it the onboard controller to control carrier 40. On-board controller 70 can deactivate actuator 68 when instructed to do so by the central controller, such as when the carrier has reached the end of the exit segment 28 of system 20, but the actuator cannot be enabled without human control. This prevents the central controller from taking control of the vehicle until a human operator has determined that it is appropriate to relinquish control. Central controller 72 comprises a microprocessor 74 and a transceiver 76 for communicating with on-board controllers 70 on each of the carriers. Central controller 72 also controls switches 38 to direct carriers 40 to various locations in system 20. The transceivers preferably operate at radio frequencies, but infrared frequencies or other means of communication may be used.

Each of the carriers is also equipped with a contactor 75 for engaging power rail 23 to draw current therefrom in a well-known manner. When the vehicle is following guide rails 22 it is powered by current from power rail 23; when away from the guide rails, a battery 77 provides current to the vehicle. Current from the power rail is also used to recharge battery 77.

Figure 6:
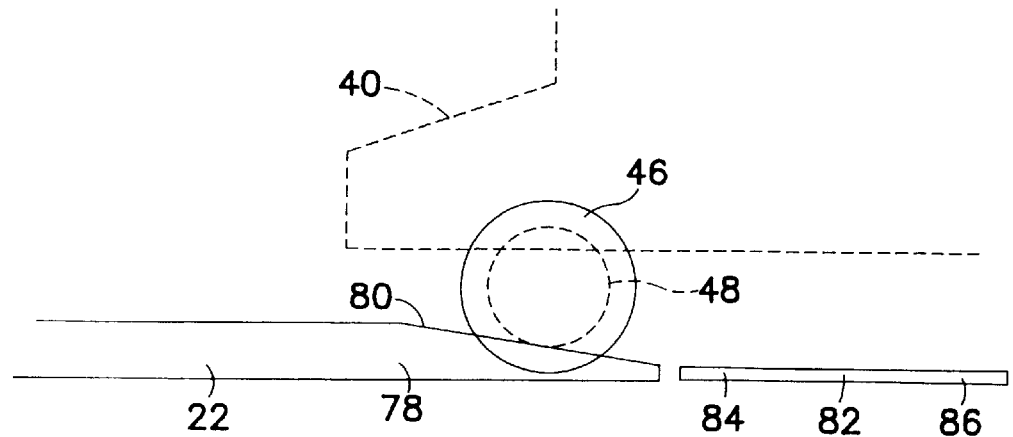
FIG. 6 is a side elevational view of the front wheels of the vehicle of FIG. 2 engaging the rails of the automated portion of the subject system; and, FIG. 7 is a plan view of the front wheels of the vehicle of FIG. 2 approaching the guidance rails and power rail of the automated portion of the system.
Figure 7:
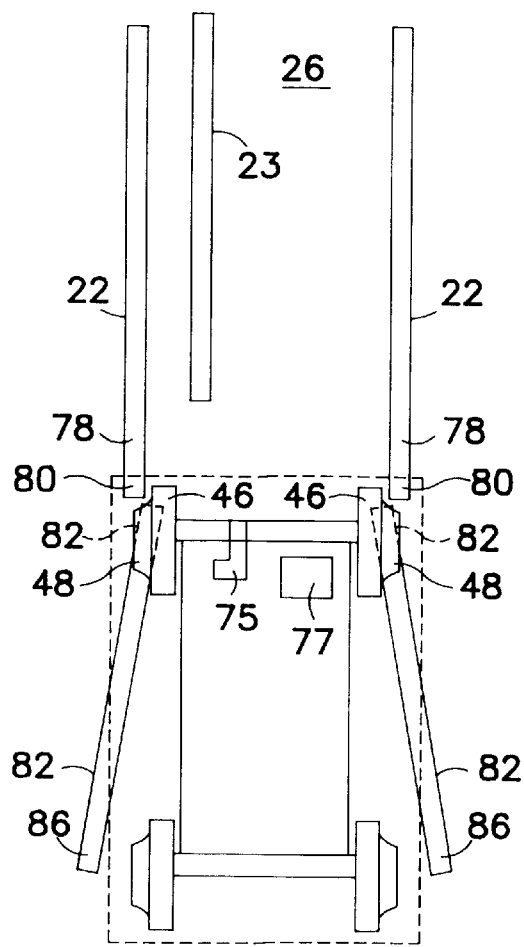

Each of the ends 78 of rails 22 at entrance segment 26 and at exit segment 28 includes an angled ramp portion 80 for guiding wheels 42 onto the rails. Moreover, each entrance segment 26 is provided with a pair of angled guide rails 82 for guiding wheels 42 into alignment with rails 22. As shown in FIG. 7, guide rails 82 have first ends 84 near ramp portions 80 which are spaced more closely than rails 22, and second ends 86 spaced away from rails 22 which are spaced more widely apart than rails 22. Guide rails 82 are spaced only a small distance off of the ground so as not to interfere with wheel second portions 48 but are raised enough to guide tires 46 and align second portions 48 with rails 22 as shown in FIG. 7. FIG. 6 shows how tires 46 are lifted off of the ground as wheel second portions 48 engage ramps 80 to transfer carrier 40 from ground travel to rail travel.

The operation of the system will next be described. An operator boards a carrier 40 which is waiting on exit segment 28 of track end 24 and drives the carrier into position next to a cargo door 90 of an aircraft 92. Steering wheel 58, accelerator 60, and brake pedal 64 are all used during this process. Cargo is then unloaded from plane 92 onto carrier 40, and when this loading is complete, the driver maneuvers carrier 40 away from the aircraft and toward end portion 24 of rail system 20. The driver must align the wheels 42 of the carriers with the tracks 22 and guide the carrier onto the track. This alignment is facilitated by the presence of guide rails 82 leading up to entrance 26. The wheels 42 of carrier 40 are spaced part approximately the same distance as the spacing between rails 22; guide rails 82 have ends 86 spaced apart a greater distance than rails 22. As the operator approaches rails 22, guide rails 82 will gently nudge tires 46 into proper alignment so that second portions 48 of wheels 42 properly contact ramps 76 as shown in FIG. 7. As second portions 48 frictionally engage rails 22 they begin to move carrier 40 along the track. Carrier 40 is driven a short distance along entrance track 26 and then stopped. At this point, the driver throws switch 73 into the automated guidance position and exits the vehicle. After a short delay to allow the driver get clear of the carrier, central controller 72 instructs onboard controller 70 to move carrier 40 along tracks 22 and into terminal 12.

Because carrier 40 is full of luggage, controller 72 will direct it to a baggage claim area, such as area 16, via first siding 32. Central controller 72 sends a signal to onboard controller 70 which causes throttle 62 to open and carrier 40 to move along entrance segment 26 and onto main loop 30. As the carrier approaches the switch 38 at the entrance to siding 32, controller 72 sends a signal to the switch to shift it into a position to allow carriers into the siding. Once the carrier has passed, and if there is no other carrier immediately behind the first carrier 40 which also needs to enter this siding, switch 38 is shifted back to its original position to allow carriers to travel along main loop 30. The carrier is stopped in front of a discharge location in the baggage claim area so that the carrier can be unloaded either manually or automatically onto baggage claim conveyor 17. At this point the switch 73 is shifted by the controller back to the manual control position so that the carrier does not move accidentally while being unloaded.

When the unloading is complete, switch 72 is moved back into the automatic position, and central controller directs the carrier to go to one of three locations. Travel to each of these locations will be described hereinafter, it being understood that the central controller may direct the carrier to any one of these locations, or to another baggage claim area, as conditions warrant. Assuming that the carrier is not needed anywhere when it finishes unloading, it will be directed to a storage location such as storage spur 36 where it will remain in automatic control mode and await further commands from the central controller. Next it may receive a command to proceed to a make-up area, such as make-up area 18. The central controller will direct the carrier around loop 30 to the make-up area and then shift the carrier into manual mode while it is filled with baggage heading for an outbound flight. After carrier 40 is loaded, it is switched back into automated mode and directed by central controller 72 around loop 30 and toward one of the ends of track 22 and onto an exit segment 28. Here the carrier stops and shifts into manual mode to wait for a human operator to assume control and drive the carrier to the cargo door of an aircraft. Exit segment 28 is long enough to allow several carriers to queue while waiting for a human operator. After it is unloaded, the empty carrier is either driven to another plane for receiving baggage or returned to track 20 for storage by the system until needed again. Alternately, the operator may park the vehicle in the gate area for future use.

The system shown in FIG. 1 includes only one baggage claim, one make-up area, and two track end sections in the gate area of the airport. Airports are generally more complex than shown in this figure, and the system can easily be modified to include numerous sidings, storage spurs, and track ends to accommodate this greater complexity. Sometimes it may be desirable to operate a system as two or more self contained subsystems, such as when the systems are located in physically remote areas of an airport or other cargo handling facility. It should also be recognized that while the preferred embodiment has been described in terms of airports and airplanes, the system could equally well find application in connection with the loading and unloading of trucks, trains, ships, or other cargo vehicles. These and other modifications will become apparent to those skilled in the art after reading and understanding this specification taken together with the attached drawings. It is intended that all such modifications be included in this invention to the extent that they are described by the several claims appended hereto.

I claim:

1. A cargo handling system for transporting cargo from a storage compartment in a carrier to one of plurality of cargo delivery areas comprising:

at least one vehicle for carrying the cargo;

controls for controlling said at least one vehicle;

a defined pathway comprising a roadway and a railway, the roadway positioned between the storage compartment and an entrance to the railway, the railway extending from the entrance to the delivery areas, the entrance of the railway inclined to permit the vehicle to be manually driven onto the railway;

an unloading station at each delivery area for unloading cargo carried by the vehicle;

an electronic controller for actuating said controls to control said at least one vehicle along said railway, said controller including means for identifying the cargo when said vehicle arrives at the entrance and directing said vehicle along the railway and to one of the cargo delivery areas based on the identification of the cargo;

a manual actuator for manually actuating said controls to control said at least one vehicle on the roadway; and, a switch for shifting control of said at least one vehicle between said electronic actuator and said manual actuator.

2. The cargo handling system of claim 1 wherein said at least one vehicle is supported by a plurality of wheel means, and wherein each said wheel means includes a resilient surface portion for supporting said at least one vehicle on said roadway and another surface portion for supporting said at least one vehicle on said railway.

3. The cargo handling system of claim 2 wherein each of said wheel means comprises a wheel body having the another surface portion and a tire surrounding a portion of the wheel body and including the resilient surface portion.

4. The cargo handling system of claim 3 wherein said tires contact the ground to support said vehicle away from said pathway and wherein said tire are held away from the ground by said wheels when said vehicle is on said pathway.

5. The cargo handling system of claim 3 wherein said pathway comprises a pair of spaced apart rails supported on the ground and wherein said wheels engage said rails to support said at least one vehicle along said pathway.

6. The cargo handling system of claim 5 wherein said rail includes a support surface spaced apart from the ground and wherein said entrance comprises a portion of said support surface angled toward the ground.

7. The cargo handling system of claim 1 wherein said at least one vehicle comprises a plurality of vehicles and wherein said pathway includes a queuing section near said entrance for storing a number of said plurality of vehicles.

8. The cargo handling system of claim 1 wherein said pathway includes a storage section for storing a number of said plurality of vehicles.

9. The system of claim 1, wherein the railway includes a loop portion so that the vehicle can return to the roadway after unloading for transporting additional cargo.

10. A method of transporting objects from a variable position storage unit to one of a number of fixed locations comprising the steps of:

providing at least one vehicle having manual controls and an automatic guidance system capable of responding to commands from a controller;

providing a pathway comprising a roadway and a railway, the roadway positioned between the variable position storage unit and an entrance to the railway, the railway extending from the entrance to the an unloading position proximate to each of said fixed locations;

manually positioning said at least one vehicle near said variable position storage unit using vehicle wheels;

loading said at least one vehicle;

manually guiding said at least one vehicle to said entrance and manually driving said vehicle onto said railway from the roadway;

shifting control of said at least one vehicle to said controller when said vehicle is on the railway and inputting information related to the objects being transported to the controller;

selecting one of said unloading positions base on the inputted information and automatically guiding said at least one vehicle to said one unloading position along the railway based on the inputted information; and, unloading said at least one vehicle at one of the fixed locations.

11. The method of claim 10 including the additional steps of:

automatically guiding said at least one vehicle from one of said unloading positions to said entrance;

shifting control of said at least one vehicle away from said controller; and, manually guiding said at least one vehicle off said railway and away from said entrance.

12. The method of claim 10 wherein said at least one vehicle comprises a plurality of vehicles.

13. The method of claim 12 including the additional steps of:

determining whether said at least one vehicle is needed at said entrance; and, automatically guiding said at least one vehicle to said entrance.

14. The method of claim 10, including propelling the vehicle onto the railway using a portion of the vehicle wheels.

15. The method of claim 10, comprising including a loop portion in said railway so that the vehicle can return to the roadway after unloading for transporting additional objects.

16. The method of claim 10, wherein the variable position storage unit is an airplane and the loading step further comprises loading cargo onto said at least one vehicle.

17. The method of claim 16, wherein the cargo includes baggage.

18. A baggage handling system for transporting baggage from a location near an aircraft to a baggage delivery area inside a terminal comprising:

a defined pathway comprising a pair of spaced apart guiding rails supported on the ground and by the floor inside said terminal, said pathway having an end section spaced apart from said aircraft and extending into said delivery area;

a power rail supported by said floor between said spaced apart guiding rails;

at least one motorized vehicle for carrying the baggage, said vehicle being supported by a plurality of wheel means comprising wheel portions for supporting said at least one vehicle on said guiding rails and tire portions for supporting said vehicle on the ground, said vehicle further comprising a battery for providing power to said vehicle and a contactor for drawing current from said power rail;

controls for controlling said at least one vehicle;

an electronic actuator for actuating said controls to control said at least one vehicle along said defined pathway;

a manual actuator for manually actuating said controls to control said at least one vehicle off of said defined pathway and along said end section; and, a switch for shifting control of said at least one vehicle between said electronic actuator and said manual actuator.

* * * * *